United States Patent
Koyama et al.

(10) Patent No.: US 10,209,703 B2
(45) Date of Patent: Feb. 19, 2019

(54) COMMUNICATION SYSTEM AND MOBILE TERMINAL

(71) Applicant: FANUC CORPORATION, Yamanashi (JP)

(72) Inventors: Yasuaki Koyama, Yamanashi-ken (JP); Yoshinori Hoshino, Yamanashi-ken (JP); Tetsushi Takahara, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/808,170

(22) Filed: Nov. 9, 2017

(65) Prior Publication Data
US 2018/0136634 A1    May 17, 2018

(30) Foreign Application Priority Data

Nov. 14, 2016 (JP) .................................. 2016-221954

(51) Int. Cl.
*G06K 9/00* (2006.01)
*G05B 19/4093* (2006.01)
(Continued)

(52) U.S. Cl.
CPC ..... *G05B 19/40932* (2013.01); *G05B 19/4083* (2013.01); *G05B 19/4099* (2013.01);
(Continued)

(58) Field of Classification Search
CPC .......... G05B 19/40932; G05B 19/4099; G05B 2219/36175; G06T 7/0004; G06T 2207/30164; H04W 88/02
(Continued)

(56) References Cited

U.S. PATENT DOCUMENTS

2015/0346901 A1*  12/2015  Cho .................... G06F 3/0488
                                                              345/419
2016/0253082 A1*   9/2016  Sakamoto .......... G06F 3/04847
                                                              715/719
(Continued)

FOREIGN PATENT DOCUMENTS

JP          2002123307 A     4/2002
JP          2005295547 A    10/2005
(Continued)

OTHER PUBLICATIONS

English Abstract for Japanese Publication No. 2017-102648 A, published Jun. 8, 2017, 1 pg.
(Continued)

*Primary Examiner* — Van D Huynh
(74) *Attorney, Agent, or Firm* — Fredrikson & Byron, P.A.

(57) ABSTRACT

A communication system is equipped with a mobile terminal and a controller of an industrial machine for forming a shaped product. Mutual communications are carried out between the controller and the mobile terminal. The mobile terminal includes an image capturing unit for capturing an image of an object to be imaged, an image conversion unit which converts the captured image data captured by the image capturing unit and generates converted image data according to an image format rule corresponding to the controller, a setting data creation unit which creates setting data for the converted image data, so that the converted image data can be used by the controller, and a data transmission and reception unit which carries out communications with the controller and transmits the converted image data and the setting data to the controller.

15 Claims, 9 Drawing Sheets

(51) Int. Cl.
  *G06T 7/50*       (2017.01)
  *G06T 7/00*       (2017.01)
  *G05B 19/4099*    (2006.01)
  *G05B 19/408*     (2006.01)
  *H04N 7/18*       (2006.01)
  *H04N 7/01*       (2006.01)
  *H04W 88/02*      (2009.01)

(52) U.S. Cl.
  CPC .............. *G06T 7/0004* (2013.01); *G06T 7/50* (2017.01); *H04N 7/183* (2013.01); *G05B 2219/36175* (2013.01); *G06T 2207/10004* (2013.01); *G06T 2207/30164* (2013.01); *G06T 2210/32* (2013.01); *H04N 7/01* (2013.01); *H04W 88/02* (2013.01)

(58) Field of Classification Search
  USPC ........................................................ 382/153
  See application file for complete search history.

(56) References Cited

U.S. PATENT DOCUMENTS

| | | | | |
|---|---|---|---|---|
| 2017/0024177 A1* | 1/2017 | Yamaguchi | ............ | G06F 3/1292 |
| 2017/0139397 A1* | 5/2017 | Kawai | ................ | G05B 19/409 |
| 2017/0153608 A1* | 6/2017 | Ueda | ................... | G05B 13/024 |

FOREIGN PATENT DOCUMENTS

| | | | |
|---|---|---|---|
| JP | 2013176822 | A | 9/2013 |
| JP | 2013206267 | A | 10/2013 |
| JP | 2016124259 | A | 7/2016 |
| JP | 2016157400 | A | 9/2016 |
| JP | 2017102648 | A | 6/2017 |

OTHER PUBLICATIONS

English Abstract and Machine Translation for Japanese Publication No. 2013-206267 A, published Oct. 7, 2013, 33 pgs.
English Abstract and Machine Translation for Japanese Publication No. 2013-176822 A, published Sep. 9, 2013, 8 pgs.
English Abstract and Machine Translation for Japanese Publication No. 2002-123307 A, published Apr. 26, 2002, 15 pgs.
English Machine Translation of Decision to Grant dated Jun. 26, 2018 issued by Japan Patent Office in JP Application No. 2016-221954, 2 pgs.
English Machine Translation of Notification of Refusal dated Apr. 10, 2018 issued by Japan Patent Office in JP Application No. 2016-221954, 2 pgs.
Untranslated Decision to Grant dated Jun. 26, 2018 issued by Japan Patent Office in JP Application No. 2016-221954, 3 pgs.
Untranslated Notification of Refusal dated Apr. 10, 2018 issued by Japan Patent Office in JP Application No. 2016-221954, 3 pgs.
English Abstract for Japanese Publication No. 2016-157400 A, published Sep. 1, 2016, 1 pg.
English Abstract and Machine Translation for Japanese Publication No. 2016-124259 A, published Jul. 11, 2016, 10 pgs.
English Abstract and Machine Translation for Japanese Publication No. 2013-176822 A, published Sep. 9, 2013, 9 pgs.
English Abstract and Machine Translation for Japanese Publication No. 2005-295547 A, published Oct. 20, 2005, 7 pgs.

* cited by examiner

FIG. 6A

| APPLICATION TYPE | MACHINING PROGRAM NUMBER | FILE PATH INFORMATION | NAME OF WORKPIECE | IMAGE CAPTURING DATE AND TIME |
|---|---|---|---|---|
| PROGRAM DISPLAY | O 0001 | C:\IMAGE\CYLINDER.BMP | CYLINDER | 2016/9/14 21:14 |

FIG. 6B

| APPLICATION TYPE | NAME OF PART TO BE MAINTAINED | FILE PATH INFORMATION | IMAGE CAPTURING DATE AND TIME |
|---|---|---|---|
| DISPLAY OF PART TO BE MAINTAINED | TABLE | C:\IMAGE\TABLE10.BMP | 2016/9/10 8:53 |

FIG. 6C

| APPLICATION TYPE | NAME OF TOOL | FILE PATH INFORMATION | IMAGE CAPTURING DATE AND TIME |
|---|---|---|---|
| TOOL DISPLAY | DRILL | C:\IMAGE\DRILL.BMP | 2016/9/12 13:43 |

FIG. 7A

| APPLICATION TYPE | MACHINING PROGRAM NUMBER | FILE PATH INFORMATION | NAME OF WORKPIECE | IMAGE CAPTURING DATE AND TIME |
|---|---|---|---|---|
| PROGRAM DISPLAY | O 0001 | C:\IMAGE\CYLINDER.BMP | CYLINDER | 2016/9/14 21:14 |
| | O 0002 | C:\IMAGE\CUBE.BMP | CUBE | 2016/5/14 10:52 |
| | ... | ... | ... | ... |

FIG. 7B

| APPLICATION TYPE | NAME OF PART TO BE MAINTAINED | FILE PATH INFORMATION | IMAGE CAPTURING DATE AND TIME |
|---|---|---|---|
| DISPLAY OF PART TO BE MAINTAINED | TABLE | C:\IMAGE\TABLE10.BMP | 2016/9/10 8:53 |
| | | C:\IMAGE\TABLE9.BMP | 2016/3/9 16:28 |
| | | ... | ... |

FIG. 7C

| APPLICATION TYPE | NAME OF TOOL | FILE PATH INFORMATION | IMAGE CAPTURING DATE AND TIME |
|---|---|---|---|
| TOOL DISPLAY | DRILL | C:\IMAGE\DRILL.BMP | 2016/9/12 13:43 |
| | END MILL | C:\IMAGE\ENDMILL.BMP | 2016/9/11 11:22 |
| | ... | ... | ... |

FIG. 9
| | |
|---|---|
| 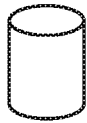 | O 0001<br>2016/9/14 21:14<br>CYLINDER |
|  | O 0002<br>2016/5/14 10:52<br>CUBE |
| ⋮ | ⋮ |

COMMUNICATION SYSTEM AND MOBILE TERMINAL

CROSS-REFERENCE TO RELATED APPLICATION

This application is based upon and claims the benefit of priority from Japanese Patent Application No. 2016-221954 filed on Nov. 14, 2016, the contents of which are incorporated herein by reference.

BACKGROUND OF THE INVENTION

Field of the Invention

The present invention relates to a communication system for carrying out communications between a mobile terminal and a controller for an industrial machine, as well as to such a mobile terminal.

Description of the Related Art

Japanese Laid-Open Patent Publication No. 2013-176822 discloses that a plurality of cameras are installed in a machining space, a part of a workpiece that is machined by a tool is automatically tracked by the cameras, and images, which are acquired by the cameras, are displayed on a display terminal.

Further, in Japanese Laid-Open Patent Publication No. 2016-124259, an industrial machine is disclosed in which image data of maintenance portions are imported from the exterior, the imported image data are stored for each of the maintenance portions, and image data of the maintenance portions are displayed in chronological order.

SUMMARY OF THE INVENTION

In the aforementioned Japanese Laid-Open Patent Publication No. 2013-176822, the plurality of cameras are installed in the machining space, and the machined portion is imaged from a plurality of different angles by the plurality of cameras. However, in the case that the cameras are only temporarily required, installation of the plurality of cameras is costly and too expensive from a practical standpoint. Further, with the installed cameras, the image capturing range is restricted, and it is impossible to capture images apart from objects and locations assumed in advance.

In the aforementioned Japanese Laid-Open Patent Publication No. 2016-124259, the image data is acquired from the exterior. For example, in the case that image data captured by a digital camera is used in the industrial machine, it is necessary to change the image format or the image size, and further, operations to register settings are necessary so that the industrial machine can utilize the image data, and the procedure therefor is complex.

Thus, an object of the present invention is to provide a communication system and a mobile terminal, which are capable of automatically setting image data captured by the mobile terminal, so that the image data can be used on the side of a controller for an industrial machine.

A first aspect of the present invention is a communication system equipped with a mobile terminal and a controller of an industrial machine that is configured to form a shaped product, wherein the communication system carries out mutual communications between the mobile terminal and the controller. The mobile terminal includes an image capturing unit configured to capture an image of an object to be imaged, an image conversion unit configured to convert captured image data captured by the image capturing unit, and generate converted image data according to an image format rule corresponding to the controller, a setting data creation unit configured to create setting data for the converted image data, so that the converted image data can be used by the controller, and a terminal side data transmission and reception unit configured to carry out communications with the controller and transmit the converted image data and the setting data to the controller. The controller includes a control side data transmission and reception unit configured to carry out communications with the mobile terminal, and receive the converted image data and the setting data from the mobile terminal, a setting data storage unit configured to store the setting data, an image storage unit configured to store the converted image data, and a control side display unit configured to display an image of the converted image data, which is read out from the image storage unit with reference to the setting data.

A second aspect of the present invention is a mobile terminal configured to carry out communications with controllers of a plurality of types of industrial machines that are configured to form a shaped product, comprising an image capturing unit configured to capture an image of an object to be imaged, a usage destination selecting unit configured to select a controller as a usage destination of captured image data captured by the image capturing unit, responsive to an operation from an operator, an information acquisition unit configured to acquire an image format rule and a setting data format rule corresponding to the controller of the selected usage destination, an image conversion unit configured to convert the captured image data, and generate converted image data according to the image format rule, a setting data creation unit configured to create setting data according to the setting data format rule, so that the converted image data can be used by the controller, and a data transmission and reception unit configured to carry out communications with the controller and transmit the converted image data and the setting data to the controller.

According to the present invention, image data captured by the mobile terminal can be easily set and registered in the controller so that the image data can be used in the controller. Stated otherwise, simply by an operator capturing an image, the captured image data is automatically set and registered in the controller, and therefore, operations performed by the operator are simplified. Further, since the image is captured using the mobile terminal, the degree of freedom in capturing images is improved, and the object to be imaged can be easily captured.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 6A is a diagram showing an example of setting data created according to a setting data format rule corresponding to an application for displaying a machining program;

FIG. 6B is a diagram showing an example of setting data created according to a setting data format rule corresponding to an application for displaying the state of a part to be maintained;

FIG. 6C is a diagram showing an example of setting data created according to a setting data format rule corresponding to an application for displaying a tool;

FIG. 7A is a diagram showing an example in which the setting data shown in FIG. 6A is added to a setting data file corresponding to the application for displaying the machining program;

FIG. 7B is a diagram showing an example in which the setting data shown in FIG. 6B is added to a setting data file corresponding to the application for displaying the state of a part to be maintained;

FIG. 7C is a diagram showing an example in which the setting data shown in FIG. 6C is added to a setting data file corresponding to an application for displaying the tool;

FIG. 9 is a diagram showing an example of content displayed in step S23 of FIG. 8, when the application for displaying the machining program is started.

DESCRIPTION OF THE PREFERRED EMBODIMENTS

Preferred embodiments of a communication system and a mobile terminal according to the present invention will be presented and described in detail below with reference to the accompanying drawings.

Figure 1:
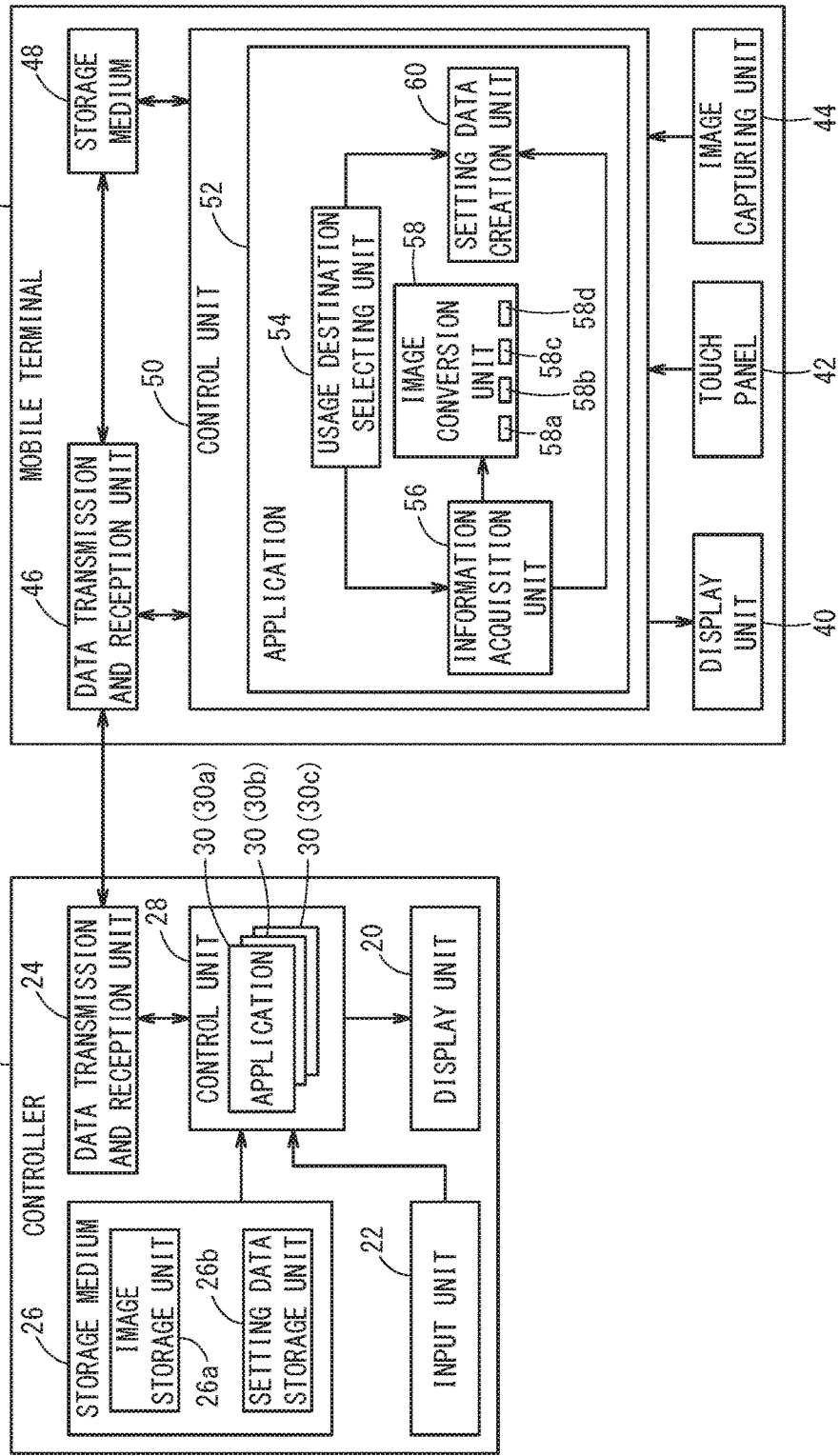
FIG. 1 is an overall configuration diagram of a communications system.

FIG. 1 is an overall configuration diagram of a communication system 10. The communication system 10 is equipped with a controller (numerical controller) 12 for an industrial machine, such as a machine tool, an injection molding machine, an electrical discharge machine, a press machine, or the like, for forming a shaped product, and a mobile terminal 14 such as a smartphone or a tablet PC. The mobile terminal 14 and the controller 12 are capable of communicating mutually with each other. According to the present embodiment, in the case of forming a shaped product, in addition to forming the shaped product by injection molding, it is also possible to form the shaped product by carrying out machining on an object to be machined, as well as to form the shaped product by press working. In the present embodiment, a machine tool for carrying out machining on an object to be machined using a tool is adopted as the industrial machine. A workpiece can be obtained as a shaped product by the machine tool.

In the controller 12, a plurality of applications 30 of mutually different types are installed. The plural types of applications 30 serve to display predetermined content using images, and the types of content to be displayed differ in each of the applications 30. According to the present embodiment, as the plurality of applications 30, an application 30a adapted to display a machining program by using images of workpieces (shaped products) which are subjected to machining by the machining program (a shaping program for forming a shaped product), an application 30b for displaying the state of a part to be maintained, and an application 30c for displaying a tool using an image of the tool are installed in the controller 12.

A dedicated application 52 is installed in the mobile terminal 14 for capturing images to be displayed by each of the plural types of applications 30 that are installed in the controller 12, as well as transmitting the obtained images to the controller 12. The dedicated application 52 may be installed in the mobile terminal 14 by downloading data of the dedicated application 52 from the Internet, or may be installed in the mobile terminal 14 by acquiring data of the dedicated application 52 from a non-illustrated external storage medium.

The controller 12 includes a display unit 20, an input unit 22, a data transmission and reception unit 24, a storage medium 26, and a control unit 28. The display unit (control side display unit) 20 is constituted by a liquid crystal display or an organic EL display or the like, and displays necessary information to an operator. The input unit 22 is an operation unit for enabling the operator to input commands and information, etc. The input unit 22 is constituted by a numeric keypad for entering numerical data, a keyboard, a touch panel, a volume knob, and the like. The touch panel of the input unit 22 is provided on a display screen of the display unit 20.

The data transmission and reception unit (control side data transmission and reception unit) 24 exchanges (transmits and receives) data by carrying out communications with the mobile terminal 14 (more specifically, a data transmission and reception unit 46 of the mobile terminal 14). The data transmission and reception unit 24 receives image data, setting data, and the like which are transmitted thereto from the mobile terminal 14. Further, as necessary, the data transmission and reception unit 24 transmits an image format rule, a setting data format rule, and the like, which are stored in the storage medium 26, to the mobile terminal 14. The setting data, the image format rule, and the setting data format rule will be described later.

The controller 12 and the mobile terminal 14 are connected by a USB (Universal Serial Bus) cable, and the data transmission and reception unit 24 performs communications with the mobile terminal 14 through an interface that can be connected to a USB cable provided in the controller 12. Moreover, the controller 12 and the mobile terminal 14 may carry out communications wirelessly by way of Bluetooth (registered trademark), infrared communications, a wireless LAN, or the like.

The storage medium 26 includes an image storage unit 26a in which there are stored image data transmitted thereto from the mobile terminal 14 via the data transmission and reception unit 24, and a setting data storage unit 26b in which there are stored setting data transmitted thereto from the mobile terminal 14 via the data transmission and reception unit 24. The setting data storage unit 26b stores a plurality of setting data for each of the applications 30 in the form of setting data files. Further, the storage medium 26 also stores a basic program, as well as programs of the installed applications 30 (30a, 30b, 30c). The storage medium 26 is constituted by a device, such as a hard disk or a nonvolatile memory or the like, which is capable of storing data.

The control unit 28 includes a processor such as a non-illustrated CPU or the like, and a buffer memory composed of a volatile memory or the like. The processor executes the basic program (OS: Operating System) stored in the storage medium 26, and functions as the control unit 28 of the present embodiment. The control unit 28 includes the plurality of applications 30 (30a, 30b, 30c) of different types. The control unit 28 functions as the plurality of applications 30 (30a, 30b, 30c) by executing the programs of the applications 30 that are stored in the storage medium 26. The applications 30 control at least the display unit 20.

The applications 30 refer to setting data of setting data files that are stored in the setting data storage unit 26b, read out the image data stored in the image storage unit 26a, and display images of the read image data together with necessary information contained within the setting data on the display unit 20.

The application 30a refers to setting data of a setting data file corresponding to the application 30a that is stored in the setting data storage unit 26b, and displays at least on the display unit 20 an image of the image data of the workpiece (shaped product) stored in the image storage unit 26a, and information indicative of a machining program (shaping program) by which the workpiece has been formed. The application 30a may associate a plurality of types of machining programs and images of a plurality of workpieces (shaped products) that have been formed by the plural machining programs, and may also display in a list the images of image data of the plurality of workpieces. In accordance therewith, it is possible for an operator to easily recognize what types of workpieces are formed by the respective machining programs.

The application 30b refers to setting data of a setting data file corresponding to the application 30b that is stored in the setting data storage unit 26b, and at least displays an image of image data of a part to be maintained, which is stored in the image storage unit 26a, and information indicating the type of part to be maintained (the name of the part to be maintained). Application 30b may display in a list in chronological order a plurality of image data obtained by capturing images of the same part to be maintained. In accordance therewith, it is possible for an operator to easily confirm deterioration due to aging and the like of the part to be maintained.

The application 30c refers to setting data of a setting data file corresponding to the application 30c that is stored in the setting data storage unit 26b, and at least displays an image of image data of a tool which is stored in the image storage unit 26a, and information (a tool name) indicating the type of tool. The application 30c may associate a plurality of tool names and images of a plurality of tools, and may also display, in a list, images of image data of the plurality of tools. In accordance therewith, it is possible for an operator to easily recognize the shape and external appearance of each of the plurality of tools.

The mobile terminal 14 includes a display unit 40, a touch panel 42, an image capturing unit 44, the data transmission and reception unit 46, a storage medium 48, and a control unit 50. The display unit (terminal side display unit) 40 is constituted by a liquid crystal display or an organic EL display or the like, and displays necessary information to the operator. The touch panel 42 is provided on a display screen of the display unit 40, and serves as an operation unit for the operator to input commands and information, etc. Accordingly, while observing the display screen of the display unit 40, the operator can input commands, information, etc., by touching buttons and the like that are displayed on the display screen. Moreover, a mechanical operation unit constituted by a keyboard or the like may be provided on the mobile terminal.

The image capturing unit 44 is constituted by a camera having an imaging element such as a CCD or a CMOS, and obtains image data by capturing images of objects to be imaged. The image capturing unit 44 outputs the captured image data to the control unit 50. By altering the attitude and position of the mobile terminal 14, which is held by the operator in his or her hand, the image capturing unit 44 is capable of capturing an image of a machined item (shaped item) or a part (including a tool) whose image is to be captured.

In accordance with this feature, the image capturing unit 44 can capture an image of a workpiece (shaped product) that is subjected to machining by the machining program (a shaping program for shaping the shaped product), an image of a part to be maintained, or an image of a tool. Image data of the workpiece that is subjected to machining by the machining program is used by the application 30a, image data of the part to be maintained is used by the application 30b, and image data of the tool is used by both applications 30b and 30c.

The dedicated application 52 at least serves to control the image capturing unit 44 and the display unit 40. The dedicated application 52 acquires image data of a captured moving image, and causes the display unit 40 to display the acquired image data of the moving image as a through image (live view image). In addition, when the operator presses an image capture button displayed on the display unit 40, the dedicated application 52 acquires image data of a still image captured at that timing (hereinafter, such data may also be referred to as captured image data). The dedicated application 52 causes the display unit 40 to display the captured image data that was acquired.

The data transmission and reception unit 46 transfers (transmits and receives) data by carrying out communications with the controller 12 (more specifically the data transmission and reception unit 24 thereof). The controller 12 and the mobile terminal 14 are connected by a USB (Universal Serial Bus) cable, and the data transmission and reception unit 46 performs communications with the controller 12 through an interface that can be connected to a USB cable and is provided in the mobile terminal 14.

The storage medium 48 stores a basic program, a program of the installed dedicated application 52, an image format rule, and a setting data format rule, and the like. The storage medium 48 is a device, such as a hard disk or a nonvolatile memory or the like, which is capable of storing data. The storage medium 48 may store the total capacity (maximum capacity) of the image storage unit 26a of the controller 12. Further, the total capacity may be included within the setting data format rule.

The image format rule is an image data format rule of the captured image data that can be used on the side of the controller 12. Further, the setting data format rule is a format rule for the setting data so as to enable the captured image data to be used on the side of the controller 12. In order to be capable of using the captured image data on the side of the controller 12, the setting data is defined by setting information for the purpose of setting (storing) the captured image data in the controller 12 (more specifically, in the image storage unit 26a thereof), or setting information of captured information that is set (stored) in the controller 12. The setting data is information in which there are correlated or associated with each other, information (names) indicative of the captured image data, types of applications in which the captured image data is used, and location information (e.g., file path information) such as address information indicative of a storage location in the controller 12, or the like.

Since the format rule of the setting data differs for each of the applications 30 installed in the controller 12, the setting data format rule corresponding to the application 30 is stored in the storage medium 48, for each of the applications 30. Further, in the case that the format rule of the image data capable of being used by the application 30 is different for each of the applications 30 installed in the controller 12, an image format rule corresponding to the application 30 is stored in the storage medium 48, for each of the applications 30.

In the present embodiment, although a description was given in which the image format rule is changed for each of the applications 30, if the same image data format rule is common to all of the applications 30, a single type of captured image data can be used with all of the applications 30. Therefore, it becomes unnecessary for the images of the same object to be stored for each application, and the storage capacity of the image storage unit 26a can be suppressed.

Further, according to the present embodiment, although the image format rules and the setting data format rules are stored in advance in the storage medium 48, the controller 12 may also transmit the image format rules and the setting data format rules to the mobile terminal 14, and the image format rules and the setting data format rules, which have been received by the data transmission and reception unit 46, may be stored in the storage medium 48.

The control unit 50 includes a processor such as a non-illustrated CPU or the like, and a buffer memory composed of a volatile memory or the like. The processor executes the basic program (OS: Operating System) stored in the storage medium 48, and functions as the control unit 50 of the present embodiment. The control unit 50 includes the dedicated application 52 therein. The control unit 50 functions as the dedicated application 52 by executing a program of the dedicated application 52 that is stored in the storage medium 48.

The dedicated application 52 includes a usage destination selecting unit 54, an information acquisition unit 56, an image conversion unit 58, and a setting data creation unit 60. Responsive to an operation by the operator, the usage destination selecting unit 54 selects the application 30 which will use the images to be captured by the image capturing unit 44 from now on. By operating the touch panel 42, the operator specifies the application 30 that uses images of the captured image data, and the usage destination selecting unit 54 selects the specified application 30. Further, responsive to an operation by the operator, the usage destination selecting unit 54 may select an object to be imaged which serves as an imaging target from among a plurality of objects to be imaged that correspond to the selected application 30. The usage destination selecting unit 54 outputs information indicative of the selected application 30 to the information acquisition unit 56, and together therewith, outputs information indicative of the selected object to be imaged to the setting data creation unit 60.

The information acquisition unit 56 reads out and acquires the image format rules and the setting data format rules that are stored in the storage medium 48. The information acquisition unit 56 acquires from the storage medium 48 the image format rule and the setting data format rule corresponding to the application 30 selected by the usage destination selecting unit 54. The information acquisition unit 56 outputs the acquired image format rule to the image conversion unit 58, and outputs the acquired setting data format rule to the setting data creation unit 60.

Moreover, the information acquisition unit 56 may read out and acquire the total capacity (maximum capacity) that the image storage unit 26a is capable of storing in the storage medium 48, and may output the acquired total capacity to the image conversion unit 58. Further, the information acquisition unit 56 may acquire the remaining capacity of the image storage unit 26a, which was sent thereto from the controller 12 via the data transmission and reception unit 46, and may output the acquired remaining capacity to the image conversion unit 58.

The image conversion unit 58 converts the captured image data that was captured by the image capturing unit 44 in accordance with the image format rule acquired by the information acquisition unit 56. The image conversion unit 58 outputs the captured image data, which was generated by the conversion, to the data transmission and reception unit 46, and thereby transmits the captured image data to the controller 12. Stated otherwise, the captured image data converted by the image conversion unit 58 is transmitted to the controller 12 through the data transmission and reception unit 46.

In this instance, in order to distinguish between captured image data captured by the image capturing unit 44 and captured image data after transformation thereof by the image conversion unit 58, the captured image data which was generated as a result of conversion by the image conversion unit 58 (post conversion captured image data) may be referred to as converted image data in certain cases.

The image conversion unit 58 comprises an image format conversion unit 58a, an image size conversion unit 58b, an image compression unit 58c, and an information appending unit 58d.

The image format conversion unit 58a converts the image format rule of the captured image data in accordance with the image format rule acquired by the information acquisition unit 56. For example, in the case that the captured image data is in a JPEG format, and the application 30 using the captured image only supports a format rule other than JPEG (for example, a BMP format), the image conversion unit 58 converts the JPEG format image data into a BMP format. Accordingly, in the image format rule, information is included concerning the image format rule that can be used by the application 30.

The image size conversion unit 58b converts the image size of the captured image data in accordance with the image format rule acquired by the information acquisition unit 56. Accordingly, in the image format rule, information is included concerning the image size that can be used by the application 30.

The image compression unit 58c compresses the captured image data at a compression ratio corresponding to the total capacity (maximum capacity) of the image storage unit 26a acquired by the information acquisition unit 56. Stated otherwise, if the total capacity of the image storage unit 26a is large, the compression ratio is made smaller, and if the total capacity of the image storage unit 26a is small, the compression ratio is made larger. Moreover, the image compression unit 58c may compress the captured image data at a compression ratio corresponding to the remaining capacity of the image storage unit 26a. Stated otherwise, if the remaining capacity of the image storage unit 26a is large, the compression ratio is made smaller, and if the remaining capacity of the image storage unit 26a is small, the compression ratio is made larger.

The information appending unit 58d appends supplementary information to the captured image data. For example, the information appending unit 58d inserts into the image of the captured image data, characters indicating the date and time or simply the date at which the image was captured, and applies markings to sites deserving attention (for example, a component to be maintained) included in the image. In the case of applying a marking to the position of a site that deserves attention, the information appending unit 58*d* may perform an image recognition process to specify where the position of the site deserving attention is, and the marking may be applied at the position of the specified site. Further, from within the image of the captured image data displayed on the display unit 40, the information appending unit 58*d* may specify a site that was touched by the operator as a region deserving attention, and may apply a marking to the position of the specified site. In the case of performing image recognition, since characteristic data of a site deserving attention may be necessary, it is advisable to store such characteristic data in the storage medium 48.

According to the present embodiment, the image conversion unit 58 is equipped with the image format conversion unit 58*a*, the image size conversion unit 58*b*, the image compression unit 58*c*, and the information appending unit 58*d*. However, the image conversion unit 58 may comprise at least one of the image format conversion unit 58*a* and the image size conversion unit 58*b*.

The setting data creation unit 60 creates setting data in accordance with the setting data format rule acquired by the information acquisition unit 56. The setting data created by the setting data creation unit 60 is information in which there are correlated or associated with each other, information (names of the converted image data) indicative of the converted image data, types of applications in which the converted image data is used, location information (e.g., file path information) indicative of a storage location of the converted image data in the image storage unit 26*a* of the controller 12, and information indicative of the objects to be imaged, or the like. Moreover, the setting data creation unit 60 may also create setting data by correlating or associating information of the image capturing date and time or simply the image capturing date of image data of the still images.

In the case that the captured image data is used by the application 30*a*, the setting data creation unit 60 creates setting data in accordance with the setting data format rule corresponding to the application 30*a*. More specifically, the setting data creation unit 60 creates setting data in which there are associated the name of the converted image data showing an image of a workpiece (shaped product), information indicative of the type of application 30 in which the converted image data is used (information indicating the application 30*a*), location information indicative of a storage location of the converted image data in the image storage unit 26*a*, and information indicating the machining program (shaping program) for shaping the workpiece (shaped product) (information indicating the object to be imaged). At this time, the setting data creation unit 60 may also associate and store information indicating the type of workpiece to be shaped by the application 30*a* (information indicating an object to be imaged, for example, its name), and may associate and store the image capturing date and time or simply the image capturing date of the image data of the workpiece.

In the case that the captured image data is used by the application 30*b*, the setting data creation unit 60 creates setting data in accordance with the setting data format rule corresponding to the application 30*b*. More specifically, the setting data creation unit 60 creates setting data in which there are associated the name of the converted image data showing an image of the part to be maintained, information indicative of the type of application 30 in which the converted image data is used (information indicating the application 30*b*), location information indicative of a storage location of the converted image data in the image storage unit 26*a*, information indicating the type of part to be maintained (information indicating the object to be imaged, for example, its name), and information indicating an image capturing data and time or an image capturing data of the image data of the part to be maintained. At this time, the setting data creation unit 60 may also associate and store information indicative of an installation location where the part to be maintained is disposed in the machine tool (industrial machine).

In the case that the captured image data is used by the application 30*c*, the setting data creation unit 60 creates setting data in accordance with the setting data format rule corresponding to the application 30*c*. More specifically, the setting data creation unit 60 creates setting data in which there are associated the name of the converted image data showing an image of the tool, information indicative of the type of application 30 in which the converted image data is used (information indicating the application 30*c*), location information indicative of a storage location of the converted image data in the image storage unit 26*a*, and information indicating the type of tool (information indicating the object to be imaged, for example, its name). At this time, the setting data creation unit 60 may also associate and store information indicating the image capturing date and time or simply the image capturing date of the tool.

Moreover, in the case that the converted image data are written in the image storage unit 26*a* by the image conversion unit 58, the setting data creation unit 60 creates setting data on the basis of the location information, which indicates the location where the data are written in the image storage unit 26*a* by the image conversion unit 58. Further, in the case that the setting data creation unit 60 has created the setting data by specifying the storage location of the converted image data in the image storage unit 26*a*, the converted image data is stored in the image storage unit 26*a* in accordance with the location information included in the setting data. In the present embodiment, it is assumed that the setting data creation unit 60 creates the setting data by specifying the storage location of the converted image data in the image storage unit 26*a*.

Figure 2:
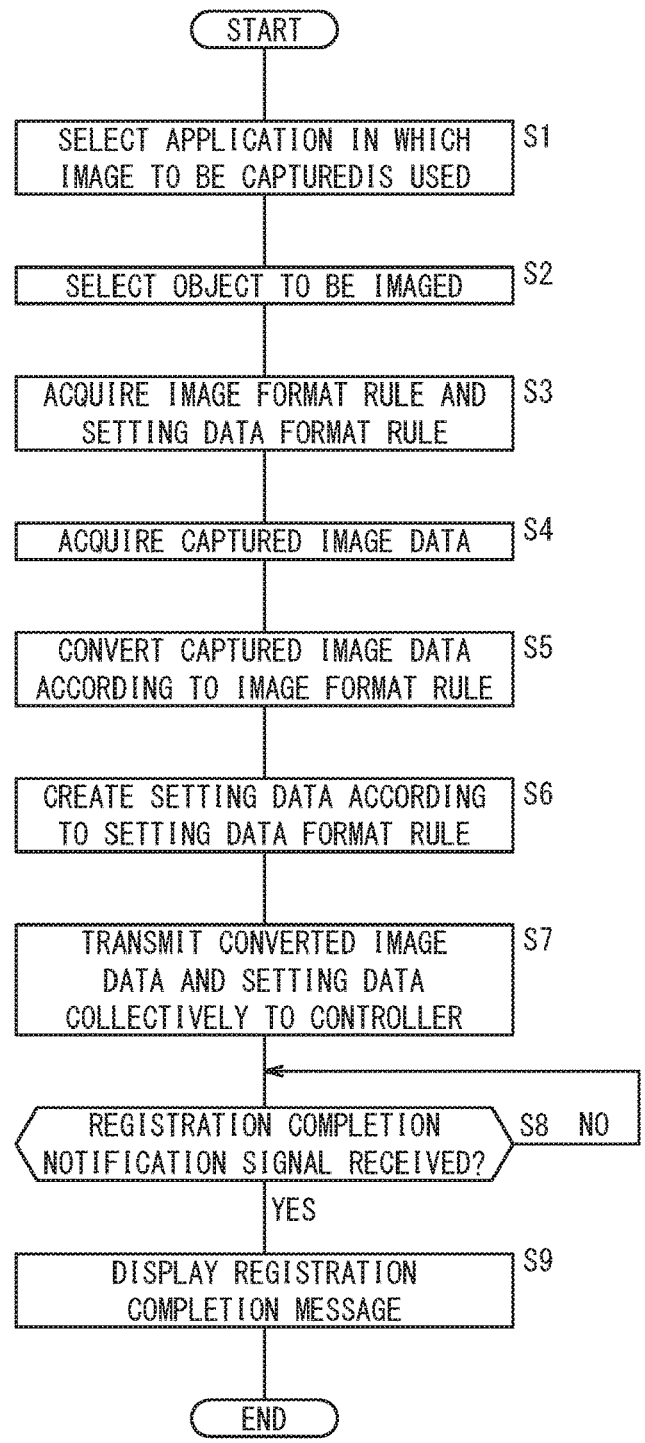
FIG. 2 is a flowchart indicating operations in relation to communications of a mobile terminal shown in FIG. 1.
Figure 3:
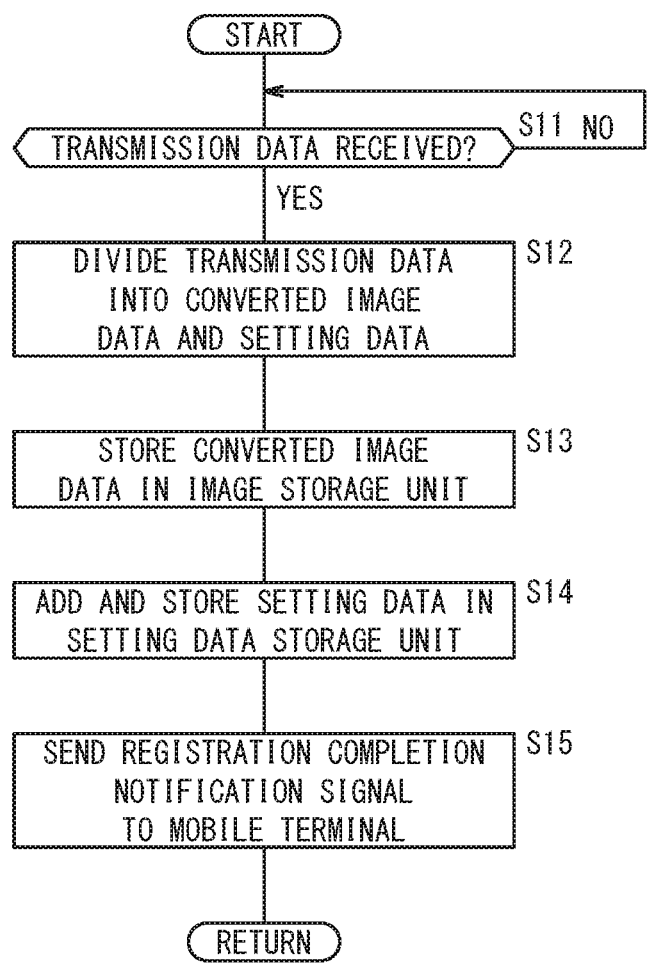
FIG. 3 is a flowchart indicating operations in relation to communications of a controller shown in FIG. 1.

Next, communication operations carried out by the communication system 10 will be described with reference to FIGS. 2 and 3. FIG. 2 is a flowchart indicating operations in relation to communications of the mobile terminal 14, and FIG. 3 is a flowchart indicating operations in relation to communications of the controller 12. First, operations of the mobile terminal 14 will be described with reference to FIG. 2, and thereafter, operations of the controller 12 will be described with reference to FIG. 3.

When the dedicated application 52 is started by operation of the touch panel 42, in step S1 of FIG. 2, the usage destination selecting unit 54 of the dedicated application 52 selects, from among the installed applications 30 (30*a*, 30*b*, 30*c*) of the controller 12, the application 30 which will use an image to be captured from now on. For example, the usage destination selecting unit 54 displays a list of names, which indicate the plurality of applications on the display unit 40, and a specified application 30 is selected by the operator operating the touch panel 42.

Next, in step S2, the usage destination selecting unit 54 of the dedicated application 52 selects an object to be imaged which serves as an imaging target from among a plurality of objects to be imaged that correspond to the selected application 30. Upon selecting the application 30, the usage destination selecting unit 54 displays a screen on the display unit 40 for allowing the operator to specify the object to be imaged, and selects the object to be imaged that was specified by operation of the touch panel 42 by the operator.

Figure 4:
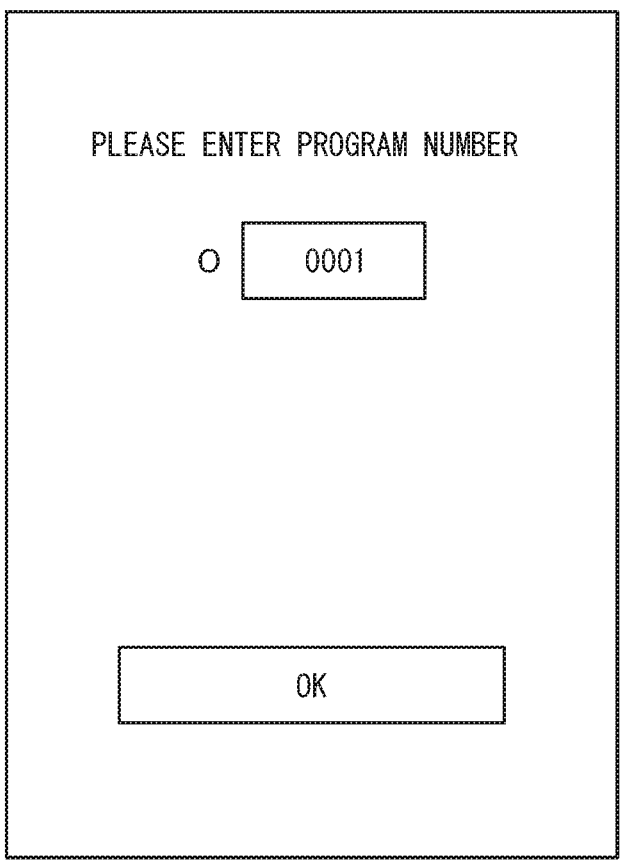
FIG. 4 is a diagram showing a display screen for prompting input of a machining program number for the purpose of selecting an object to be imaged.

For example, in the case that the application 30a for displaying a machining program is selected in step S1, the usage destination selecting unit 54 displays a screen enabling the operator to designate a machining program (shaping program) for forming the workpiece (shaped product) that serves as the object to be imaged. For example, as shown in FIG. 4, the application 30a displays a screen prompting the operator to specify (input) the number of the machining program. In addition, when a machining program has been designated (input) by the operator operating the touch panel 42, and an OK button (confirmation button) is pressed, a workpiece (shaped product) to be formed by the specified machining program is selected as the object to be imaged.

In the case that the application 30b for displaying the state of a part to be maintained is selected in step S1, the usage destination selecting unit 54 displays a screen for allowing the operator to designate the type of part to be maintained that serves as the object to be imaged. In addition, when the type of part to be maintained has been designated by the operator operating the touch panel 42, and an OK button (confirmation button) is pressed, a part to be maintained of the specified type is selected as the object to be imaged.

In the case that the application 30c for displaying a tool is selected in step S1, the usage destination selecting unit 54 displays a screen for allowing the operator to designate the type of tool that serves as the object to be imaged. In addition, when the type of tool has been designated by the operator operating the touch panel 42, and an OK button (confirmation button) is pressed, a tool of the specified type is selected as the object to be imaged.

In the present description, it will be assumed that the application 30a is selected in step S1, a machining program number "00001" for machining a cylinder is specified by the operator, and the cylinder which serves as a workpiece is selected as the object to be imaged in step S2.

Next, in step S3, the information acquisition unit 56 of the dedicated application 52 acquires from the storage medium 48 the image format rule and the setting data format rule that correspond to the application 30a selected in step S1. At this time, the information acquisition unit 56 may acquire from the storage medium 48 information indicating the total capacity (maximum capacity) of the image storage unit 26a, and may acquire from the storage medium 48 characteristic data of a site where a marking is applied. Moreover, the information acquisition unit 56 may acquire information indicative of the total capacity or information indicative of the remaining capacity of the image storage unit 26a, which was sent thereto from the controller 12 via the data transmission and reception unit 46.

Next, in step S4, using the image capturing unit 44, the dedicated application 52 acquires the captured image data which was obtained by capturing an image of the cylinder (the workpiece as an object to be imaged). At this time, by controlling the image capturing unit 44 and the display unit 40, the dedicated application 52 acquires image data of a moving image captured by the image capturing unit 44, and causes the display unit 40 to display the acquired image data of the moving image as a through image (live view image). During this period, so as to capture an image of the cylinder, the operator alters the position and posture of the mobile terminal 14 which is held in the operator's hand. Thereafter, when the operator presses an image capture button displayed on the display unit 40, the image capturing unit 44 outputs as captured image data to the dedicated application 52 the image data of a still image of the cylinder which was captured at that timing. The dedicated application 52 then causes the display unit 40 to display the captured image data that was acquired.

Figure 5:
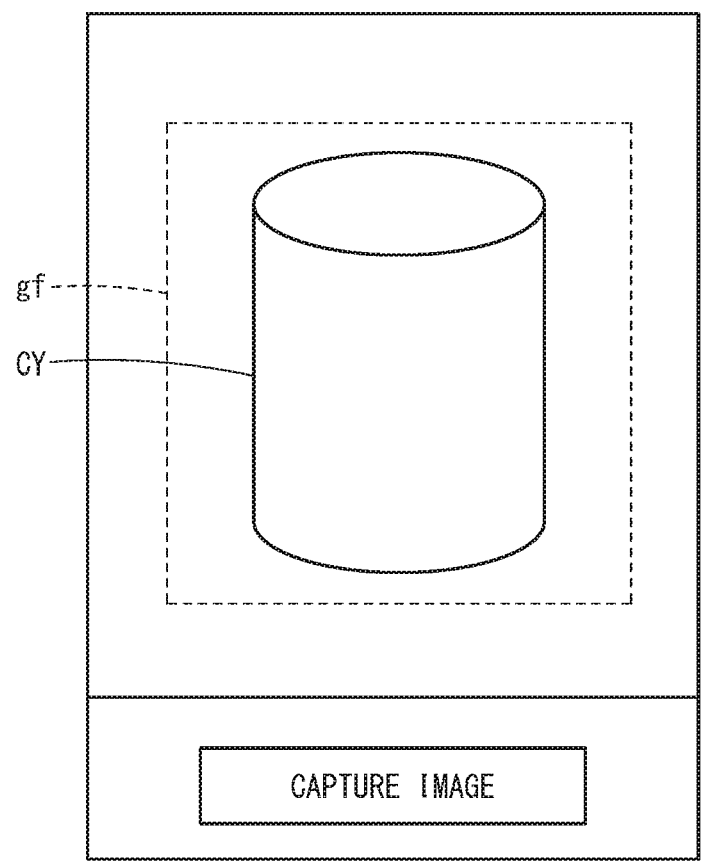
FIG. 5 is a diagram showing a guide that is displayed for the purpose of assisting in capturing an image of the object to be imaged while a through image is displayed.

While the through image is displayed, the dedicated application 52 may display a guide for assisting in imaging of the object to be imaged. For example, if the application 30 selected in step S1 corresponds only to a square image, a square guide frame gf may be displayed on the display screen of the display unit 40. Further, a guide frame gf having a shape that coincides with the shape of the object to be imaged selected in step S2 may be displayed. In accordance therewith, the operator is guided to change the position and posture of the mobile terminal 14, so that the cylinder (object to be imaged) is positioned within the guide frame gf. In FIG. 5, an example is shown in which a square guide frame gf is displayed on the display unit 40 together with the through image. As shown in FIG. 5, the operator is guided to change the position and posture of the mobile terminal 14, so that the cylinder CY as the object to be imaged is positioned within the guide frame gf. In addition, when the image capture button is pressed, the dedicated application 52 acquires, as captured image data, image data obtained by cutting out an image residing inside of the guide frame gf from within the captured still image.

Next, in step S5, the image conversion unit 58 of the dedicated application 52 converts the captured image data that was acquired in step S4 in accordance with the image format rule acquired in step S3, and thereby generates the converted image data. In accordance with the image format rule acquired in step S3, the image conversion unit 58 converts at least one of the image format and the image size of the captured image data. Further, the image conversion unit 58 may compress the captured image data at a compression ratio corresponding to the total capacity or the remaining capacity of the image storage unit 26a, and may apply within the image of the captured image data the date and time or simply the date at which the image was captured, as well as markings.

Next, in step S6, the setting data creation unit 60 of the dedicated application 52 creates setting data in accordance with the setting data format rule acquired in step S3.

In the case that the setting data format rule acquired in step S3 is a setting data format rule corresponding to the type of the application 30a, the setting data creation unit 60 creates setting data in which there are associated the name of the converted image data showing an image of the workpiece, information indicative of the application 30a, file path information indicative of the storage location of the converted image data in the image storage unit 26a, information indicating a machining program (machining program number) for machining the object to be imaged that was specified in step S2, information indicating the workpiece (name of the workpiece) serving as the object to be imaged that was selected in step S2, and information on the date and time or simply the date at which the captured image data (image data serving as the source of the converted image data) was captured.

FIG. 6A is a diagram showing an example of setting data created according to the setting data format rule corresponding to the application 30a. In the setting data shown in FIG. 6A, there are associated the information "program display" indicating the type of the application 30, a number "00001" of the machining program, file path information "C:¥IMAGE¥CYLINDER.BMP" indicating the storage location of the converted image data in the image storage unit 26a, the name "CYLINDER" of the workpiece which is a part to be imaged, and the information "2016/9/14 21:14" indicating the date and time at which image capturing occurred.

Moreover, the word "CYLINDER" within the file path information "C:¥IMAGE¥CYLINDER.BMP" indicates the name of the converted image data, whereas "BMP" indicates the image format. Accordingly, the name of the converted image data is also stored in association with the setting data. Moreover, the operator may input the name of the converted image data by operating the touch panel 42, or the dedicated application 52 may automatically assign a name to the converted image data. For example, the name of the workpiece which is the object to be imaged that was selected in step S2 may be assigned automatically.

In the case that the setting data format rule acquired in step S3 is a setting data format rule corresponding to the type of the application 30*b*, the setting data creation unit 60 creates setting data in which there are associated the name of the converted image data, information indicative of the application 30*b*, file path information indicative of the storage location of the converted image data in the image storage unit 26*a*, information indicating the type of part to be maintained (name of the part to be maintained) that serves as the object to be imaged selected in step S2, and information on the date and time or simply the date at which the captured image data (image data serving as the source of the converted image data) was captured.

FIG. 6B is a diagram showing an example of setting data created according to the setting data format rule corresponding to the application 30*b*. In the setting data shown in FIG. 6B, there are associated the information "display of part to be maintained" indicating the type of the application 30, the word "table" indicating the name of the part to be maintained, file path information "C:¥IMAGE¥TABLE10.BMP" indicating the storage location of the converted image data in the image storage unit 26*a*, and the information "2016/9/10 8:53" indicating the date and time at which image capturing occurred. Moreover, the word "TABLE10" within the file path information "C:¥IMAGE¥TABLE10.BMP" indicates the name of the converted image data, whereas "BMP" indicates the image format. Accordingly, the name of the converted image data is also stored in association with the setting data. Moreover, the operator may input the name of the converted image data by operating the touch panel 42, or the dedicated application 52 may automatically assign a name to the converted image data. For example, the name of the part to be maintained which is the part to be imaged that was selected in step S2 may be assigned automatically.

In the case that the setting data format rule acquired in step S3 is a setting data format rule corresponding to the type of the application 30*c*, the setting data creation unit 60 creates setting data in which there are associated the name of the converted image data, information indicative of the application 30*c*, file path information indicative of the storage location of the converted image data in the image storage unit 26*a*, information indicating the type of tool (tool name) that serves as the object to be imaged selected in step S2, and information on the date and time or simply the date at which the captured image data (image data serving as the source of the converted image data) was captured.

FIG. 6C is a diagram showing an example of setting data created according to the setting data format rule corresponding to the application 30*c*. In the setting data shown in FIG. 6C, there are associated the information "tool display" indicating the type of the application 30, the word "drill" indicating the name of the tool, file path information "C:¥IMAGE¥DRILL.BMP" indicating the storage location of the converted image data in the image storage unit 26*a*, and the information "2016/9/12 13:43" indicating the date and time at which image capturing occurred. Moreover, the word "DRILL" within the file path information "C:¥IMAGE¥DRILL.BMP" indicates the name of the converted image data, whereas "BMP" indicates the image format. Accordingly, the name of the converted image data is also stored in association with the setting data. Moreover, the operator may input the name of the converted image data by operating the touch panel 42, or the dedicated application 52 may automatically assign a name to the converted image data. For example, the name of the tool which is the part to be imaged that was selected in step S2 may be assigned automatically.

Next, in step S7, the dedicated application 52 collectively transmits to the controller 12 as one piece of transmission data the converted image data generated in step S5 and the setting data created in step S6. Such a transmission is performed via the data transmission and reception unit 46. At this time, by determining in advance the order in which the converted image data and the setting data are transmitted, and the data size of the converted image data and the setting data, it is possible to clarify the ends of (or a boundary between) the converted image data and the setting data. Further, a boundary between the converted image data and the setting data may be clarified by insertion of a special symbol (delimiter) between the converted image data and the setting data. In this case, the data size of the converted image data and the setting data need not be determined in advance. In this manner, by clarifying the boundary between the converted image data and the setting data, on the side of the controller 12, it is possible for the converted image data and the setting data to be recognized from a single piece of transmission data.

Next, in step S8, the dedicated application 52 determines whether or not a registration completion notification signal was sent from the controller 12, which indicates that registration of the converted image data and the setting data has been completed. If it is determined in step S8 that a registration completion notification signal has not been transmitted, the process remains at step S8. On the other hand, if it is determined in step S8 that the registration completion notification signal has been transmitted, the process proceeds to step S9, whereupon the dedicated application 52 displays a registration completion message on the display unit 40 and then terminates the present operation.

Moreover, if it is determined in step S8 that the registration completion notification signal has not been transmitted even though a predetermined time period has elapsed since transmission of the converted image data and the setting data, the dedicated application 52 may return to step S7 and once again transmit the converted image data and the setting data, or an error message may be displayed.

Next, operations of the controller 12 will be described with reference to FIG. 3. In step S11 of FIG. 3, the control unit 28 determines whether or not the transmission data which was transmitted in step S7 of FIG. 2 has been received. If it is determined in step S11 that the transmission data has not been received, the process remains at step S11, whereas if it is determined that the transmission data has been received, the process proceeds to step S12. The control unit 28 receives the transmission data via the data transmission and reception unit 24.

Upon proceeding to step S12, the control unit 28 divides or splits the received transmission data into converted image data and setting data.

Next, in step S13, the control unit 28 causes the converted image data, which was divided out in step S12, to be stored in the image storage unit 26a. The control unit 28 causes the converted image data to be stored in the image storage unit 26a based on the file path information of the setting data which was divided out in step S12.

Next, in step S14, the control unit 28 causes the setting data, which was divided out in step S12, to be stored in the setting data storage unit 26b. The control unit 28 adds the setting data, which was divided out in step S12, to a setting data file that is stored in the setting data storage unit 26b. Since the setting data storage unit 26b stores a setting data file for each of the applications 30, the control unit 28 adds the setting data, which was divided out in step S12, to the setting data file of the particular application corresponding to the setting data that was divided out in step S12.

FIG. 7A is a diagram showing an example in which the setting data shown in FIG. 6A is added to a setting data file corresponding to the application 30a. FIG. 7B is a diagram showing an example in which the setting data shown in FIG. 6B is added to a setting data file corresponding to the application 30b. Since the application 30b displays a state (deterioration due to aging or the like) of a part to be maintained, as shown in FIG. 7B, the setting data file corresponding to the application 30b may be stored as a single file in which a plurality of setting data for each of respective parts to be maintained are included. FIG. 7C is a diagram showing an example in which the setting data shown in FIG. 6C is added to a setting data file corresponding to the application 30c.

Next, in step S15, the control unit 28 transmits to the mobile terminal 14 via the data transmission and reception unit 24 a registration completion notification signal indicating that registration of the converted image data and the setting data has been completed.

Next, operations of an application 30, which is installed in the controller 12, will be described with reference to the flowchart shown in FIG. 8.

When any one of the plurality of applications 30 is started or activated by operation of the input unit 22, then in step S21, the activated application 30 (hereinafter referred to as an activated application for the sake of convenience) reads out and acquires from the setting data storage unit 26b the plurality of setting data included within the corresponding setting data file.

Next, in step S22, using the plurality of acquired setting data, the activated application 30 reads out and acquires a plurality of converted image data from the image storage unit 26a. The activated application 30 acquires the converted image data from the image storage unit 26a using the file path information included in the setting data.

Next, in step S23, the activated application 30 displays predetermined content on the display unit 20 on the basis of the plurality of setting data acquired in step S21, and the plurality of converted image data acquired in step S22.

Figure 8:
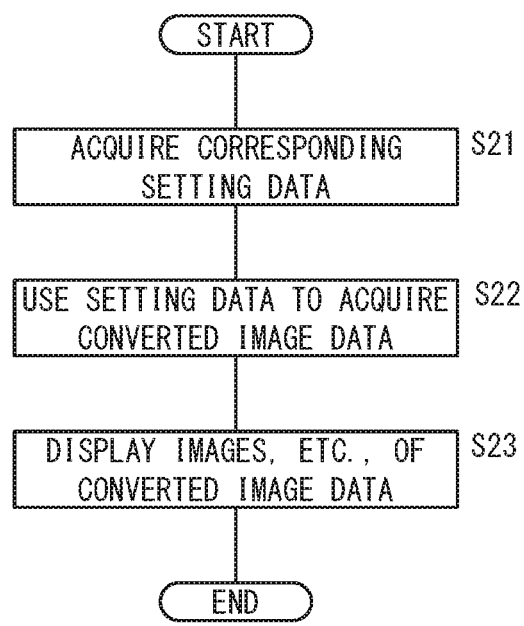
FIG. 8 is a flowchart indicating operations of an application that is installed in the controller shown in FIG. 1.

FIG. 9 is a diagram showing an example of content displayed in step S23 of FIG. 8 when the application 30a is started or activated. As shown in FIG. 9, on the basis of the plurality of setting data acquired in step S21 and the plurality of converted image data acquired in step S22, information indicating the content of the machining programs is displayed in the form of a list. More specifically, for each of the machining programs, there are associated and displayed in the form of a list, images of workpieces which are formed and shaped by the machining program, numbers of the machining programs, names of workpieces that are formed by the machining programs, and dates and times at which the images were captured.

For example, at the top, there are displayed in association with each other, an image of the workpiece that was captured most recently, the number "00001" of the machining program used to machine the workpiece, the name "CYLINDER" of the workpiece, and the image capturing date and time "2016/9/14 21:14". In addition, under the topmost item, there are displayed in association with each other an image of the next most recently captured workpiece, the number "00002" of the machining program used to machine the workpiece, the name "CUBE" of the workpiece, and the image capturing date and time "2016/5/14 10:52". In such a manner, for each of the machining programs, information indicating the content of the machining program is displayed in the form of a list. In accordance therewith, it is possible for an operator to easily recognize what types of workpieces are formed by the respective machining programs.

Similarly, in the case that the application 30b is started or activated, although not shown, for each of the parts to be maintained, the application 30b associates and displays in a list a plurality of images obtained by imaging the same part to be maintained, and the date and time at which the images were captured. At this time, the application 30b may display in a list in chronological order a plurality of images of the same part to be maintained. In accordance therewith, it is possible for an operator to easily recognize any deterioration due to aging or the like of the part to be maintained. Moreover, by the operator operating the input unit 22, the part to be maintained and which is desired to be observed may be selected from among a plurality of parts to be maintained, and the application 30b may display in the form of a list in chronological order a plurality of images of the selected part to be imaged.

Although not shown, in the case that the application 30c is started, the application 30c displays in association with each other and in the form of a list an image of the tool, the name of the tool, and an image capturing date and time. Owing thereto, it is possible for the operator to easily recognize the name of the tool as well as the shape and external appearance of the tool in association with each other.

Although in the application 30a, a plurality of machining programs are displayed in the form of a list using images of a plurality of workpieces subjected to machining by the machining programs, instead of such a list display, an image of a workpiece machined by any one of the machining programs may be displayed. For example, the application 30a may cause the operator to select a certain machining program to be displayed, and then may display an image of the workpiece subjected to machining by the machining program that was selected by the operator. Further, although the application 30c displays a plurality of tools in the form of a list using images of the plurality of tools, instead of such a list display, an image of any one of the tools may be displayed. For example, the application 30c may cause the operator to select a certain tool to be displayed, and then may display an image of the tool that was selected by the operator.

Further, in the above-described embodiment, an example has been described in which the mobile terminal 14 communicates with a single controller 12. However, the mobile terminal 14 may also be configured to communicate with a plurality of controllers 12. For example, the mobile terminal 14 may communicate with controllers 12 of a plurality of industrial machines of the same type (for example, a plurality of machine tools), or may communicate with controllers 12 of a plurality of industrial machines of different types (for example, a machine tool, an injection molding machine, and the like).

In this case, responsive to an operation of the touch panel 42 of the mobile terminal 14 made by the operator, the usage destination selecting unit 54 selects the controller 12 of the usage destination, which will use the captured image data to be captured henceforth, and together therewith, selects the application 30 from among the plurality of applications 30 installed in the controller 12 selected as the usage destination, for using the image data.

Further, since a plurality of applications 30 are installed in each of the plurality of controllers 12, image format rules and setting data format rules, which correspond to the plurality of applications 30 installed respectively in the plurality of controllers 12, also are stored in the storage medium 48 of the mobile terminal 14. Further, the storage medium 48 may store the total capacity (maximum capacity) of the image storage units 26a of the respective controllers 12.

Further, in the above embodiment, although a case has been described as an example in which multiple applications 30 of the controllers 12 are installed, the number of the applications 30 installed in the controllers 12 may be one.

As described above, the above-described communication system 10 of the present embodiment is equipped with the mobile terminal 14 and the controller 12 of an industrial machine for forming a shaped product. Mutual communications are carried out between the mobile terminal 14 and the controller 12. The mobile terminal 14 includes the image capturing unit 44 for capturing an image of an object to be imaged, the image conversion unit 58 which converts the captured image data captured by the image capturing unit 44 and generates converted image data according to an image format rule corresponding to the controller 12, the setting data creation unit 60 which creates setting data for the converted image data, so that the converted image data can be used by the controller 12, and the data transmission and reception unit 46 which carries out communications with the controller 12 and transmits the converted image data and the setting data to the controller 12. The controller 12 includes the data transmission and reception unit 24 which carries out communications with the mobile terminal 14, and receives the converted image data and the setting data from the mobile terminal 14, the setting data storage unit 26b that stores the setting data, the image storage unit 26a that stores the converted image data, and the display unit 20 which displays an image of the converted image data, which is read out from the image storage unit 26a with reference to the setting data.

In accordance with these features, image data captured by the mobile terminal 14 can be easily set and registered in the controller 12 so that the image data can be used in the controller 12. Stated otherwise, simply by an operator capturing an image, the captured image data is automatically set and registered in the controller 12, and therefore, the operations performed by the operator are simplified. Further, since the image is captured using the mobile terminal 14, the degree of freedom in capturing images is improved, and the object to be imaged can be easily captured.

The image conversion unit 58 may be installed in the controller 12, and may convert the captured image data according to an image format rule corresponding to an application 30 that displays predetermined content using images. In this case, the setting data creation unit 60 creates the setting data according to a setting data format rule corresponding to the application 30, so that the converted image data can be used by the application 30. In addition, the application 30, with reference to the setting data, reads out the converted image data that is stored in the image storage unit 26a, and displays the read out and converted image data on the control side display unit 20. In accordance with this feature, the image data captured by the mobile terminal 14 can be easily set and registered in the controller 12 so that the image data can be used by the application 30 installed in the controller 12.

A plurality of applications 30 (30a to 30c) for displaying mutually different content may be installed in the controller 12. In this case, the mobile terminal 14 is equipped with the usage destination selecting unit 54 which is adapted to select the application 30 in which the captured image data is used responsive to an operation of the operator. The image conversion unit 58 converts the captured image data according to the image format rule corresponding to the application 30 that was selected as the usage destination. The setting data creation unit 60 creates the setting data according to the setting data format rule corresponding to the application 30 that was selected as the usage destination. In accordance with these features, even in the case that a plurality of applications 30 are installed in the controller 12, the image data captured by the mobile terminal 14 can easily be set and registered in the controller 12, so that it can be used by the application 30 that uses the image data.

The application 30 (30a) may utilize an image of the shaped product that is shaped by the shaping program, and may display the shaping program. In this case, the setting data creation unit 60 creates the setting data, which is associated with at least information indicative of the converted image data showing an image of the shaped product as the object to be imaged, location information indicating a storage location of the converted image data in the image storage unit 26a, and information indicating the shaping program. In accordance with this feature, the image data captured by the mobile terminal 14 can easily be set and registered in the controller 12, so that the image data can be used by the application 30 (30a) that displays the shaping program using an image of the shaped product formed by the shaping program.

The application 30 (30b) may utilize an image of a part to be subjected to maintenance and inspection, and may display the state of the part. In this case, the setting data creation unit 60 creates the setting data, which is associated with at least information indicative of the converted image data showing an image of the part as the object to be imaged, location information indicating a storage location of the converted image data in the image storage unit 26a, information indicating a type of the part, and information indicating an image capturing date and time or an image capturing date of the image data of the part. In accordance with this feature, the image data captured by the mobile terminal 14 can easily be set and registered in the controller 12, so that the image data can be used by the application 30 (30b) that displays the state of the part using the image of the part to be subjected to maintenance and inspection.

The industrial machine may be a machine tool adapted to machine an object to be machined using a tool, and the application 30 (30c) may display the tool using an image of the tool. In this case, the setting data creation unit 60 creates the setting data, which is associated with at least information indicative of the converted image data showing an image of the tool as the object to be imaged, location information indicating a storage location of the converted image data in the image storage unit 26a, and information indicating a type of the tool. In accordance with this feature, the image data captured by the mobile terminal 14 can be easily set and registered in the controller 12 so that the image data can be used by the application 30 (30c) that displays the tool utilizing the image of the tool.

The image format rule may include at least one of an image format and an image size corresponding to the application 30, and the image conversion unit 58 may comprise at least one of the image format conversion unit 58a adapted to convert the captured image data into an image format corresponding to the application 30, and the image size conversion unit 58b adapted to convert the captured image data into the image size corresponding to the application 30. In addition, the image conversion unit 58 may further comprise at least one of the image compression unit 58c adapted to compress the captured image data corresponding to the storage capacity of the image storage unit 26a, and the information appending unit 58d adapted to append supplementary information to the captured image data.

The mobile terminal 14 comprises the display unit 40 that displays images captured by the image capturing unit 44. The terminal side display unit 40 may display a guide for the purpose of assisting in capturing an image of the object to be imaged corresponding to the application 30. Consequently, capturing of the object to be imaged can be carried out appropriately.

The mobile terminal 14 may include the storage medium 48 in which information of the image format rule and the setting data format rule is stored. Further, the data transmission and reception unit 24 may transmit information of the image format rule and the setting data format rule to the mobile terminal 14, and the data transmission and reception unit 46 may receive the information of the image format rule and the setting data format rule that is transmitted from the controller 12. In accordance with these features, the image conversion unit 58 can convert the image data in accordance with the image format rule corresponding to the application 30, and the controller 12 in which the captured images are used, and the setting data creation unit 60 can create the setting data in accordance with the setting data format rule corresponding to the application 30, and the controller 12 in which the captured images are used.

The mobile terminal 14 described in the present embodiment carries out communications with controllers of a plurality of industrial machines for shaping a shaped product. The mobile terminal 14 comprises the image capturing unit 44 adapted to capture an image of an object to be imaged, the usage destination selecting unit 54 adapted to select a controller 12 as a usage destination of captured image data captured by the image capturing unit 44 responsive to the operation from the operator, the information acquisition unit 56 adapted to acquire an image format rule and a setting data format rule corresponding to the controller 12 of the selected usage destination, the image conversion unit 58 adapted to convert the captured image data, and generate converted image data according to the image format rule, the setting data creation unit 60 adapted to create setting data according to the setting data format rule, so that the converted image data can be used by the controller 12, and the data transmission and reception unit 46 adapted to carry out communications with the controller 12 and transmit the converted image data and the setting data to the controller 12.

In accordance with these features, the image data captured by the mobile terminal 14 can be easily registered in the controller 12 so that the image data can be used by the controller 12. Stated otherwise, since the operator is only required to capture an image, the operations of the operator are simplified. Further, since the image is captured using the mobile terminal, the degree of freedom in capturing images is improved, and the object to be imaged can be easily captured.

The information acquisition unit 56 may acquire from the controller 12 of the selected usage destination the image format rule and the setting data format rule. The mobile terminal 14 comprises, for each of the plurality of industrial machines, a storage medium 48 in which the image format rule and the setting data format rule are stored corresponding to the controller 12 of the industrial machine, and the information acquisition unit 56 may acquire from the storage medium 48 the image format rule and the setting data format rule corresponding to the controller 12 of the selected usage destination. In accordance with this feature, the image conversion unit 58 is capable of converting the image data according to an image format rule that corresponds to the controller 12, and the setting data creation unit 60 is capable of creating the setting data according to a setting data format rule that corresponds to the controller 12.

The plurality of applications 30 (30a to 30c), which display mutually different content using images, are installed in the controller 12. In this case, responsive to an operation from the operator, the usage destination selecting unit 54 further selects an application 30 in which the captured image data is used, from among the plurality of applications 30 (30a to 30c) that are installed in the controller 12 of the selected usage destination. The information acquisition unit 56 acquires the image format rule and the setting data format rule corresponding to the selected application 30. Owing thereto, the image conversion unit 58 can convert the image data in accordance with the image format rule corresponding to the application 30 in which the captured images are used, and the setting data creation unit 60 can create the setting data in accordance with the setting data format rule corresponding to the application in which the captured images are used.

The present invention is not limited to the above described embodiment. It is a matter of course that various modifications can be made without departing from the gist of the present invention.

What is claimed is:

1. A communication system equipped with a mobile terminal and a controller of an industrial machine that is configured to form a shaped product, wherein the communication system carries out mutual communications between the mobile terminal and the controller;

the mobile terminal comprising:
an image capturing unit configured to capture an image of an object to be imaged;
an image conversion unit configured to convert captured image data captured by the image capturing unit, and generate converted image data according to an image format rule corresponding to the controller;
a setting data creation unit configured to create setting data for the converted image data, so that the converted image data can be used by the controller; and
a terminal side data transmission and reception unit configured to carry out communications with the controller and transmit the converted image data and the setting data to the controller;

and the controller comprising:
a control side data transmission and reception unit configured to carry out communications with the mobile terminal, and receive the converted image data and the setting data from the mobile terminal;
a setting data storage unit configured to store the setting data;
an image storage unit configured to store the converted image data; and
a control side display unit configured to display an image of the converted image data, which is read out from the image storage unit with reference to the setting data.

2. The communication system according to claim 1, wherein:
the image conversion unit is configured to be installed in the controller, and is configured to convert the captured image data according to an image format rule corresponding to an application configured to display predetermined content using an image;
the setting data creation unit is configured to create the setting data according to a setting data format rule corresponding to the application, so that the converted image data can be used by the application; and
the application, with reference to the setting data, is configured to read out the converted image data that is stored in the image storage unit, and display the read out and converted image data on the control side display unit.

3. The communication system according to claim 2, wherein:
a plurality of applications that display mutually different content are configured to be installed in the controller;
the mobile terminal comprises a usage destination selecting unit configured to select the application in which the captured image data is configured to be used responsive to an operation of an operator;
the image conversion unit is configured to convert the captured image data according to the image format rule corresponding to the application that was selected as the usage destination; and
the setting data creation unit is configured to create the setting data according to the setting data format rule corresponding to the application that was selected as the usage destination.

4. The communication system according to claim 2, wherein:
the application is configured to utilize an image of the shaped product that is shaped by a shaping program, and display the shaping program; and
the setting data creation unit is configured to create the setting data, which is associated with at least information indicative of the converted image data showing an image of the shaped product as the object to be imaged, location information indicating a storage location of the converted image data in the image storage unit, and information indicating the shaping program.

5. The communication system according to claim 2, wherein:
the application is configured to utilize an image of a part to be subjected to maintenance and inspection, and display the state of the part; and
the setting data creation unit is configured to create the setting data, which is associated with at least information indicative of the converted image data showing an image of the part as the object to be imaged, location information indicating a storage location of the converted image data in the image storage unit, information indicating a type of the part, and information indicating an image capturing date and time or an image capturing date of the image data of the part.

6. The communication system according to claim 2, wherein:
the industrial machine is a machine tool configured to machine an object to be machined using a tool;
the application is configured to display the tool using an image of the tool; and
the setting data creation unit is configured to create the setting data, which is associated with at least information indicative of the converted image data showing an image of the tool as the object to be imaged, location information indicating a storage location of the converted image data in the image storage unit, and information indicating a type of the tool.

7. The communication system according to claim 2, wherein:
the image format rule is configured to include at least one of an image format and an image size corresponding to the application; and
the image conversion unit comprises at least one of an image format conversion unit configured to convert the captured image data into the image format corresponding to the application, and an image size conversion unit configured to convert the captured image data into the image size corresponding to the application.

8. The communication system according to claim 7, wherein the image conversion unit comprises at least one of an image compression unit configured to compress the captured image data corresponding to a storage capacity of the image storage unit, and an information appending unit configured to append supplementary information to the captured image data.

9. The communication system according to claim 2, wherein:
the mobile terminal comprises a terminal side display unit configured to display an image captured by the image capturing unit; and
the terminal side display unit is configured to display a guide for a purpose of assisting in capturing an image of the object to be imaged corresponding to the application.

10. The communication system according to claim 2, wherein the mobile terminal includes a storage medium in which information of the image format rule and the setting data format rule is stored.

11. The communication system according to claim 2, wherein:
the control side data transmission and reception unit is configured to transmit information of the image format rule and the setting data format rule to the mobile terminal; and
the terminal side data transmission and reception unit is configured to receive the information of the image format rule and the setting data format rule that is transmitted from the controller.

12. A mobile terminal configured to carry out communications with controllers of a plurality of industrial machines that are configured to form a shaped product, comprising:
an image capturing unit configured to capture an image of an object to be imaged;
a usage destination selecting unit configured to select a controller as a usage destination of captured image data captured by the image capturing unit, responsive to an operation from an operator;
an information acquisition unit configured to acquire an image format rule and a setting data format rule corresponding to the controller of the selected usage destination;

an image conversion unit configured to convert the captured image data, and generate converted image data according to the image format rule;

a setting data creation unit configured to create setting data according to the setting data format rule, so that the converted image data can be used by the controller; and a data transmission and reception unit configured to carry out communications with the controller and transmit the converted image data and the setting data to the controller.

13. The mobile terminal according to claim 12, wherein the information acquisition unit is configured to acquire the image format rule and the setting data format rule from the controller of the selected usage destination.

14. The mobile terminal according to claim 12, wherein:

the mobile terminal comprises, for each of the plurality of industrial machines, a storage medium in which the image format rule and the setting data format rule are stored corresponding to the controller of the industrial machine;

wherein the information acquisition unit is configured to acquire from the storage medium the image format rule and the setting data format rule corresponding to the controller of the selected usage destination.

15. The mobile terminal according to claim 12, wherein:

a plurality of applications that display mutually different content using images are configured to be installed in the controller;

responsive to an operation from the operator, the usage destination selecting unit is configured to further select the application in which the captured image data is used, from among the plurality of applications that are installed in the controller of the selected usage destination; and the information acquisition unit acquires the image format rule and the setting data format rule corresponding to the selected application.

* * * * *